UNITED STATES PATENT OFFICE.

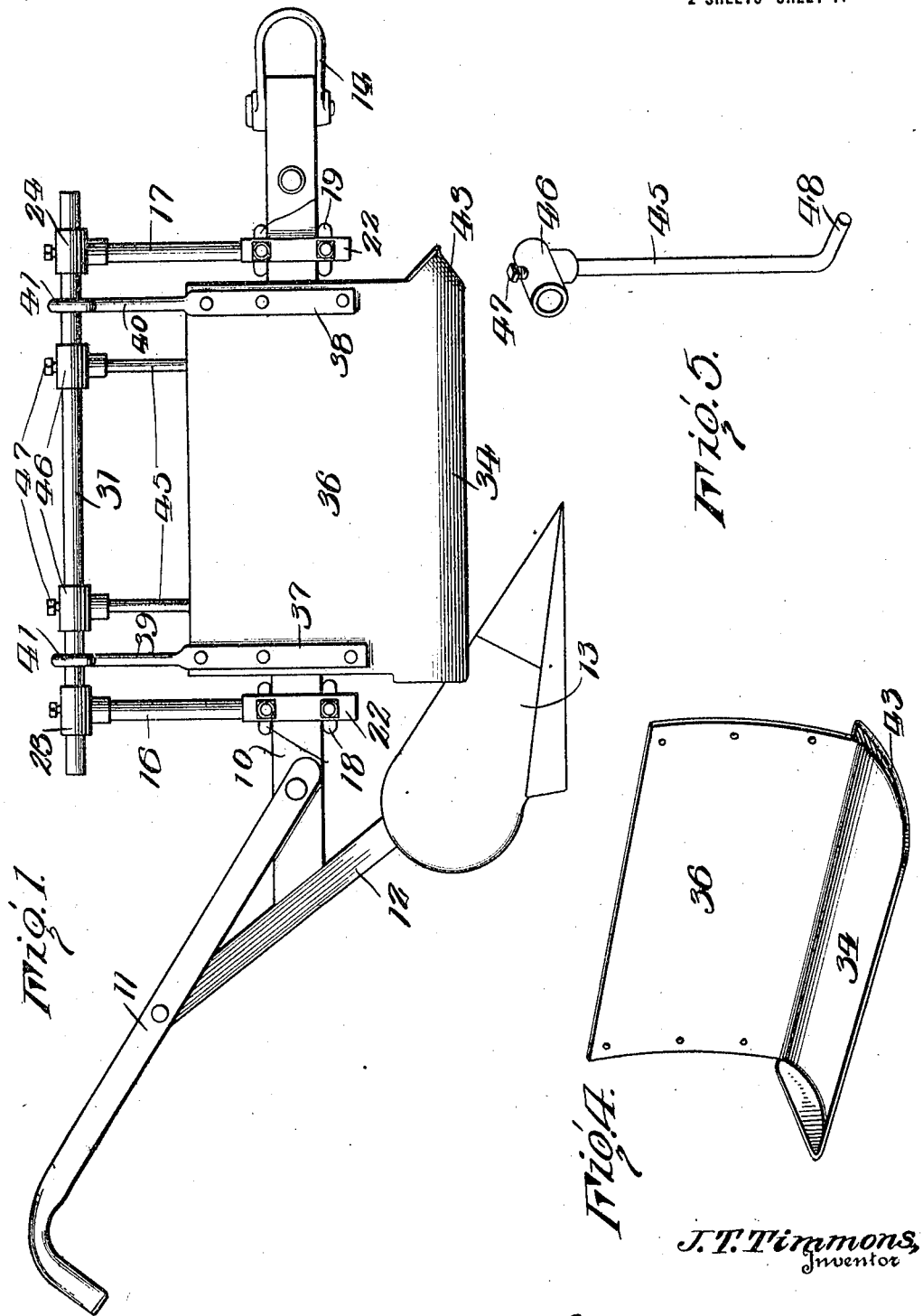

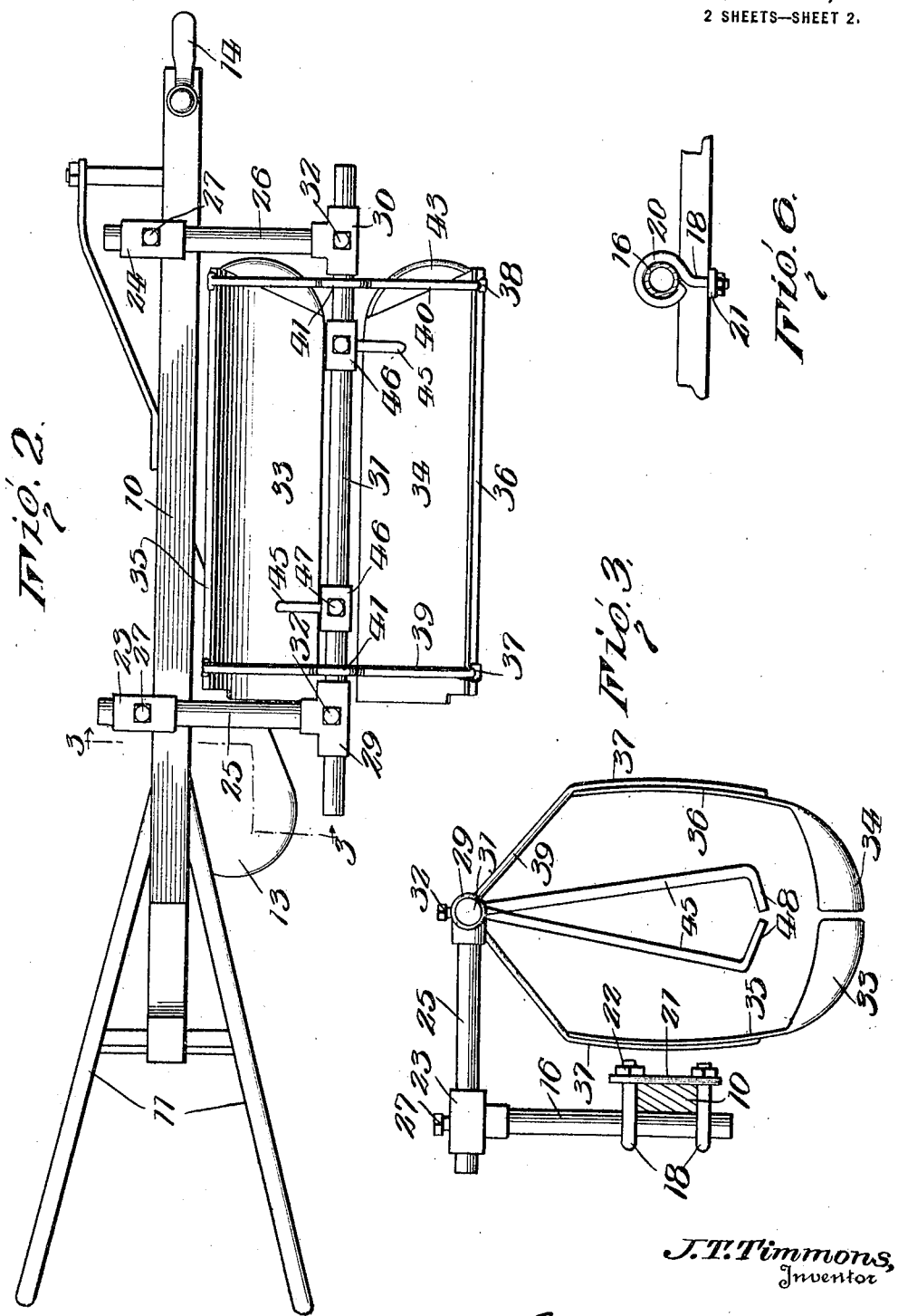

JACOB T. TIMMONS, OF AVALON, MISSISSIPPI.

BOLL-WEEVIL CATCHER.

1,256,394.

Specification of Letters Patent.

Patented Feb. 12, 1918.

Application filed December 1, 1916. Serial No. 134,329.

*To all whom it may concern:*

Be it known that I, JACOB T. TIMMONS, a citizen of the United States, and resident of Avalon, in the county of Carroll and State of Mississippi, have invented certain new and useful Improvements in Boll-Weevil Catchers, of which the following is a specification.

The present invention relates to the class of insect destroyers and has particular reference to new and useful improvements in boll weevil catchers, an object of the invention being to provide a novel insect catching device adapted for application to various agricultural machines, the catcher being particularly adapted for use in removing the boll weevil from the cotton plant.

Another object of my invention is to provide a device of the class described having means for supporting the same upon a plow beam or the like, receptacles to receive the insects, and means to knock the latter from the plant.

A further object of my invention is to provide a catcher of the class referred to which is adjustable for use in connection with various heights of plants, so that when the cotton plant has only reached a height of about one foot the insects may be as readily removed therefrom as when the plant is higher.

A still further object of my invention is to provide a device of the character described which may be cheaply manufactured and installed upon a plow or a similar agricultural implement, is strong and durable, and effective in operation.

Other objects and advantages to be derived from the use of my improved boll weevil catcher will appear from the following detailed description and the claims, taken with an inspection of the accompanying drawings, in which:

Figure 1 is a side elevation of an insect catcher embodying the improvements of my invention;

Fig. 2 is a top plan view of the same;

Fig. 3 is a transverse sectional view on the line 3—3 of Fig. 2;

Fig. 4 is a detailed perspective of one of the insect receivers;

Fig. 5 is a detailed perspective of one of the plant agitators; and

Fig. 6 is an enlarged detail of the adjustable supporting plant.

Referring more particularly to the drawings, wherein similar characters of reference designate like and corresponding parts throughout the various views, 10 designates the beam of a plow, 11 the plow handles, 12 the stock, and 13 the share. The usual clevis 14 may be mounted on the forward end of the beam 10.

My invention includes a supporting frame comprising vertical standards 16 and 17 connected to the beam 10 by means of eye-bolts 18 and 19. In Fig. 6 one of the eye-bolts is best shown, the eye portion 20 thereof encircling one of the standards and the body of the bolt lying above or below the beam 10. A pair of plates 21 are mounted on the sides of the beam opposite the standards, said bolts passing through said plates and being secured therein by means of nuts 22.

A pair of T-joint members 23 and 24 are carried by the upper ends of the standards 16 and 17, respectively, said T-joint members receiving laterally extending bars 25 and 26, said bars being secured against movement in the T members by means of set screws 27.

A pair of bearing T-members 29 and 30 are carried by the outer free ends of the bars 25 and 26, said bearing T-members serving to receive a shaft 31, said shaft being maintained against rotation in the bearing members by means of set screws 32.

A pair of insect receiving pans or troughs 33 and 34 are provided, said trough members having outer side walls 35 and 36 connected with the free ends 37 and 38 of substantially V-shaped inverted suspending elements 39 and 40. The suspending elements 39 and 40 are provided with loop portions 41 to engage the shaft 31. Said suspending members are capable of slight oscillating motion on the shaft thereby permitting the troughs to accommodate themselves to the uneven alinement of the plants passing between the same. The forward ends of the troughs 33 and 34 are upturned as at 43 and curved so as to guide the stalks between the troughs.

In Fig. 5 I have illustrated one of the plant agitators which includes a rod 45 having a key member 46 carried on the upper end thereof, said key member being receivable on the shaft 31 and secured against oscillation by means of a set screw 47. The lower end of the rod 45 is laterally bent to form an arm 48 to engage the plant stalk and the body of the plant to knock insects therefrom. From an inspection of Fig. 3 it will be clearly understood the manner in which the agitators are to be applied.

In use the device of my invention is drawn along a row of cotton or the like, the stalks thereof passing between the troughs 33 and 34. The agitators 45 engage the stalks and the body of the plant knocking the insects therefrom into the pans 33 and 34. Said pans or troughs may be filled with an insect destroying composition, liquid or otherwise.

It is not thought that a detailed discussion of the various adjustments of the device is necessary in view of the obvious manner in which the frames may be adjusted both vertically, longitudinally and horizontally. It will also be apparent that my invention is not limited to use in connection with a plow, since the same is adapted for application to any agricultural machine or implement having a beam; however, I prefer the application of my invention as shown.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. A boll weevil catcher including a frame having a laterally extending portion, a shaft carried by said portion, a pair of troughs having upwardly directed deflecting walls adjustably mounted on said shaft, said troughs being in spaced relation to accommodate plants therebetween, a pair of plant agitators depending from said shaft and angularly adjustable thereon, said trough suspending members being oscillatable on said shaft to permit the troughs to accommodate themselves to the alinement of the plants passing therebetween.

2. A boll weevil catcher including a plurality of standards, T joint members carried by the upper ends of said standards, laterally extending bars having ends mounted in said T joints, bearing members mounted on the opposite ends, a shaft mounted in the bearing T members, inverted V-shaped supporting elements, looped portions provided intermediate the ends of said supporting elements adapted to engage the shaft, and a pair of plant agitators adjustably mounted on said shaft for a purpose specified.

3. A boll weevil catcher including a plurality of standards, laterally extending bars suspended from said standards, a shaft mounted on said laterally extending bars, inverted V-shaped supporting elements, looped portions provided intermediate the ends of said supporting elements adapted to engage the shaft, plant agitators mounted on said shaft comprising rod members extending therefrom, a key for maintaining said rods on said shaft in the desired positions, arms formed on the free ends of said rods by bending the same laterally of the rods for a purpose specified.

In testimony whereof, I affix my signature hereto.

JACOB T. $\overset{\text{his}}{\times}$ TIMMONS.
mark

Witness to signature:
W. A. Lee.

Copies of this patent may be obtained for five cents each, by addressing the "Commissioner of Patents, Washington, D. C."